April 5, 1966 O. KORNEI 3,245,062

MAGNETIC ANNEALING FOR INFORMATION STORAGE

Filed Nov. 15, 1960 3 Sheets-Sheet 1

INVENTOR
OTTO KORNEI
BY Robert E. Sandt
AGENT

United States Patent Office 3,245,062

Patented Apr. 5, 1966

3,245,062

MAGNETIC ANNEALING FOR INFORMATION STORAGE

Otto Kornei, Ossining, N.Y., assignor to International Business Machines Corporation, New York, N.Y., a corporation of New York Filed Nov. 15, 1960, Ser. No. 69,339
4 Claims. (Cl. 340—174.1)

This invention relates to the art of magnetic recording, and more particularly to a method and apparatus for producing a magnetic material having improved properties, which properties are either uniformly distributed so as to produce an improved record-receiving material, or nonuniformly distributed, wherein the pattern of distribution of the properties manifests the desired stored data, or graphic representations.

Known prior art magnetic storage techniques have selectively altered the magnetization status of the magnetic record material in accordance with an input signal, the spatial distribution of the varying magnetization providing a means for storing digital data, pictorial representations, or acoustic signals. Records formed in accordance with these techniques can be sensed by a transducer which is influenced by the record magnetic gradient. In a special application the magnetic image is developed by dusting the magnetized surface with a magnetic ink to thus form a printing plate for transferring the image to paper or other record material.

In all of the foregoing techniques the magnetizable medium was, except for its state of magnetization, essentially homogeneous in its properties, in fact such homogeneity was a necessary characteristic of a successful magnetic storage medium. Inherent also in the prior art techniques was the reversibility of the recording processes, that is to say, by the application of an overriding magnetic field, the previously recorded record was permanently destroyed or erased, and a new record could then be inserted in its place.

In accordance with the teachings of the present invention, and in contrast to the prior art techniques, the properties of the magnetic record medium itself are to be nonuniformly distributed over the surface of the storage medium. The nonuniform distribution, however, rather than being random is selectively controllable, whereby the distribution of properties manifests the record to be stored. The record thus formed, as opposed to prior art records, cannot be destroyed or permanently erased by the application of an overriding magnetic field, so that a more permanent magnetic record is thus had. Additionally, the properties of material forming the basis of the magnetic record are such that conventional magnetic recording techniques can be employed to superimpose additional recordings on the record. Thus, in effect, a dual record can be produced.

While magnetic annealing has hitherto been employed to modify the overall properties of magnetic materials so as, for example, to improve the strength of permanent magnets, it has not been hitherto applied to selective areas of a magnetic material, so that the magnetically annealed areas in and of themselves constitute the record. Nor has magnetic annealing been employed to improve the magnetic properties of magnetic record materials themselves. The difficulty that has been overcome in applying magnetic annealing techniques to either the improvement of magnetic record materials, or to the recording of data or graphical representations, has been the fact that the temperature at which known materials are susceptible to magnetic annealing has been so excessive that the substrate and the binder (if one is employed) which support the magnetic material have been destroyed. It has been discovered that the cobalt substituted magnetites prepared by coprecipitation from an aqueous solution produces a fine precipitate exhibiting a response to magnetic annealing at temperatures as low as 100°–200° C. Additionally, the material thus prepared can be applied directly to either a paper or plastic substrate to form a magnetic tape, which can then be magnetically annealed by the process hereinafter to be described without thermal destruction of either the paper or the plastic. Further, because of its low magnetic annealing temperature, the material is ideally suited to be subjected to a varying heat distribution produced by apparatus such as a cathode ray tube electron beam, to produce selective magnetic annealing in distributed areas. If the whole of the material is uniformly heated and magnetically annealed, a superior magnetic recording tape results.

It is therefore an object of this invention to provide a method for producing an improved magnetic record receiving material by magnetic annealing.

Another object of this invention is to provide a method of magnetic recording, wherein the magnetic record material is selectively magnetically annealed in accordance with the pattern of the record to be stored.

A further object of the invention is the production of a superior magnetic record-receiving medium.

Yet another object of this invention is to provide an apparatus for producing a magnetic record wherein the record produced has a distribution of magnetically annealed areas manifestive of the record to be stored.

The foregoing and other objects, features and advantages of the invention will be apparent from the following more particular description of preferred embodiments of the invention, as illustrated in the accompanying drawings.

To be practical for recording by magnetic annealing a material must have suitable magnetic properties in addition to an annealing temperature low enough to be tolerated by the binder, if any, and by the substrate upon which the material is deposited in a thin layer. Certain of the metal oxides exhibit these desirable features. However, when the oxides are prepared by ceramic firing of the required constituents, a solid block of material results. Although the material thus prepared exhibits the desired properties in its bulk form, it is unsuited without grinding for deposition on a substrate. When the material is ground or ball milled to a fine powder suitable for application to a plastic or a paper substrate it undergoes a substantial but unpredictable change in its magnetic properties. Changes in the coercive force from about 25 oersteds for the bulk material, to 500 oersteds for the finished tape, for example, have been observed. In contrast thereto, a magnetic oxide prepared by coprecipitation from aqueous solutions produces a precipitate which not only exhibits the desired magnetic properties, but also it is a fine enough (one micron and less, particle size) not to require any extensive treatment, except for the mixing of "paint." Additionally, the temperature sensitivity of the coercive force is fully retained in the finished coating, while this property is usually lost or impaired in the sintered and extensively ground material. A material that has been found to exhibit the desired properties is cobalt-substituted magnetite having the formula $Co_xF_{3-x}O_4$ (where $x$ may have any value between 0 and 1).

A typical procedure for preparing a material having a formula in the above range is as follows:

*Preparation of a precipitated cobalt*

Substituted magnetite ($x$=0.12)

- Solution A:
  - 3220 grams $FeSO_4.7H_2O$
  - 136 grams $CoSO_4.7H_2O$
  - 8.4 liter water
- Solution B:
  - 1008 grams NaOH
  - 115 grams $NaNO_3$
  - 2.2 liter water Mix A and B near boiling temperature; keep boiling for approximately 30 minutes; filter, wash, and dry at low temperature.

Figure 1:
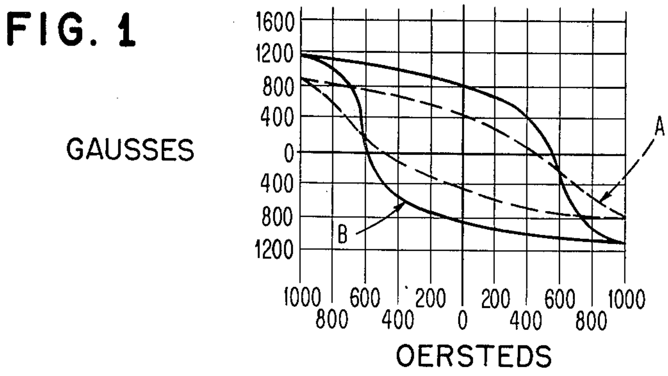
FIG. 1 is a plot of the hysteresis curves of a cobalt modified magnetite before and after magnetic annealing.

Other oxides containing varying percentages of cobalt are similarly prepared by varying the respective quantities of the constituents in the aqueous solutions. The material thus prepared is then applied to a plastic or paper tape backing to form a conventionally appearing magnetic tape. A tape having material deposited thereon in its precipitated state exhibits a hysteresis loop such as that shown at A in FIG. 1. After magnetic annealing the material exhibits a hysteresis curve such as that shown at B in FIG. 1. An examination of these two plots immediately reveals a substantial "squaring" of the hysteresis loop by virtue of the annealing process. Quantitatively, the comparison can be made that, prior to the annealing, the cobalt magnetite material exhibits a coercive force of approximately 500 oersteds, and a remanent flux density of 400 gauss, while after magnetic annealing the material exhibits a coercive force of 600 oerstads and a remanent flux density of 800 gauss. It should be noticed that the enhancement of the magnetic properties takes place only in the direction of the magnetic annealing field.

Figure 2:
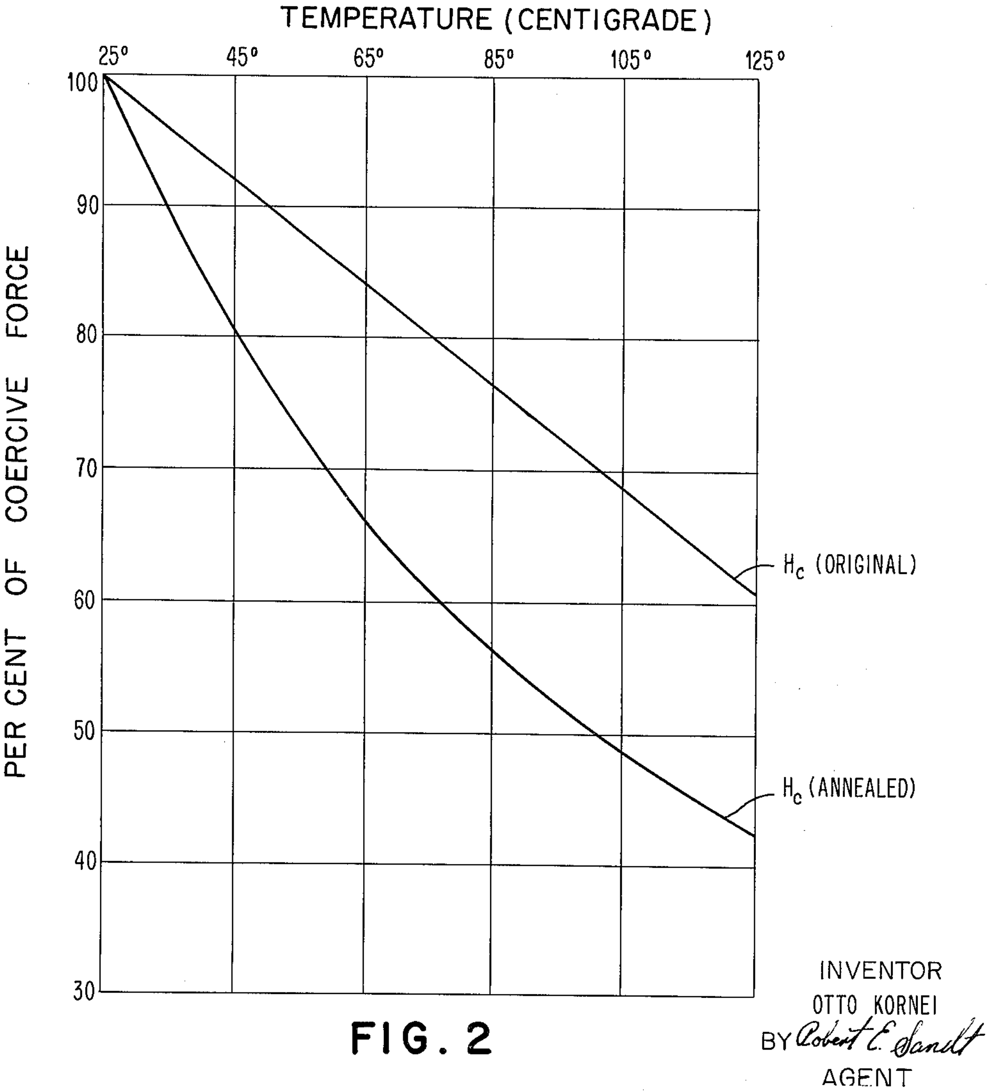
FIG. 2 is a plot of the dependence of coercive force upon temperature for a cobalt-modified magnetite before and after magnetic annealing.

A further improvement in the magnetic properties of the cobalt magnetites, prepared by coprecipitation from an aqueous solution, and magnetically annealed, is shown in FIG. 2 wherein the temperature dependence of the coercive force of the nonannealed precipitated material and the annealed material is shown. The magnetically-annealed material exhibited a greater sensitivity to temperature than does the nonannealed material. Quantitatively, the annealed material, for example, at 125° C. exhibits only 42% of the coercive force at 25° C. The nonannealed material of the same composition, on the other hand, exhibits over 60%. Thus, material which has been prepared as described, and magnetically annealed, is ideally suited for thermographic recording as taught by the prior art, for example by Sims 2,793,135. The so-called thermographic recording therein disclosed depends for its success upon the diminuation of coercive force with an increase in the temperature. Not only is it desirable that the magnetic material thus employed exhibit an appreciable temperature dependence but also it is necessary that this dependence occur at a temperature which is not destructive of the backing material to which the magnetic material is adhered, nor of the original material through which the radiant heat energy is projected to produce the patterned temperature distribution. The cobalt substituted magnetites prepared as described can be utilized directly in the Sims process in even their nonannealed state to form a magnetic image which can be erased by a conventional magnetic erasing field. Preferably, however, the annealed material is employed because of its greater temperature sensitivity as shown in FIG. 2.

An improved and more permanent record can be achieved by selectively magnetically annealing the record member. If in FIG. 2, of the above-identified Sims' patent the magnetic printing plate 10, instead of being uniformly magnetized, is uniformly magnetically annealed by one of the methods hereinafter to be described, and the magnetically annealed plate then subjected to a temperature distribution manifestive of an image to be recorded, the thus heated areas will be restored to their initial nonannealed state, while the cool areas will remain magnetically annealed. The magnetic image thus produced will consist of areas having an aligned easy axis of magnetization (magnetically annealed) and other areas having a random orientation (not magnetically annealed) for a full black and white type of production. A gray scale reproduction will have varying degrees of magnetic annealing strength, depending on the temperature to which the area had been raised.

The magnetic image formed by selective magnetic annealing offers the advantage of permanence and flexibility over that produced by conventional magnetizing techniques. Although the magnetically annealed areas produce a reaction in a magnetic transducer like that of areas which are magnetically saturated by conventional techniques, these areas cannot be permanently destroyed except by reheating and cooling out of the presence of a uniform magnetic field. A record cannot thus be accidentally erased. Additionally a record so formed can be temporarily erased, written over by conventional recording techniques, and subsequently recovered. To temporarily erase a magnetically recorded image, it need only be subjected to an erasing magnetic field, either A.C. in any direction or D.C. applied transversely to the annealing fields. The record medium is thereby conditioned to receive a subsequent record by conventional recording techniques. Erasure of this second record and the application of a uniform field aligned with the material in the first instance will cause the first recorded image to reappear.

As has been shown, the cobalt-substituted magnetites undergo an improvement in their magnetic properties when subjected to magnetic annealing. It follows then that a magnetic tape having a plastic or paper backing coated with this material and then magnetically-annealed will provide improved performance in conventional air gap magnetic recording apparatus. Whether the recording to be effected employs heads developing a vertical, transverse, or longitudinal field will determine on which axis the field for magnetic annealing shall be applied. As will hereinafter be pointed out with respect to the description of apparatus suitable for annealing the tape in a continuous process, the tape can be heated and then passed through a magnetic field, the tape remaining in constant motion. By suitable adjustment of the speed of tape feed and the length of the field, assurance can be had that the material will be sufficiently cooled by the time it leaves the influence of the field. Because of the low annealing temperatures, the field need not be unduly extended, as cooling below the annealing sensitive temperature is readily achieved. For subsequent use in a machine employing vertical recording the tape would be annealed so that the easy axis of magnetization would be perpendicular to the tape surface. Similarly, for subsequent transverse or longitudinal recording the easy axis would be respectively similarly oriented.

Figure 3:
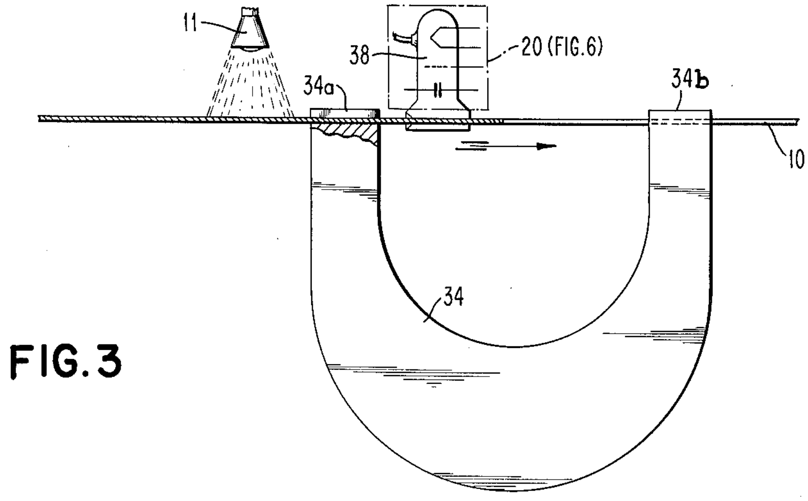
FIG. 3 shows an apparatus for magnetically annealing a material to reproduce a longitudinal easy axis of magnetization.

Considering first an apparatus for continuously magnetically annealing a tape member so as to orient the material with a longitudinally disposed easy axis, reference is made to FIG. 3. Here the tape 10 containing on the upper surface thereof cobalt-substituted magnetite in its precipitated condition is passed continuously from left to right by any suitable means. A source of heat 11, as for example an infrared lamp, is adjusted so as to raise the surface of the tape 10 to a temperature wherein the material chosen is responsive to magnetic annealing. Continuous feeding of the thus heated tape from the heat source 11 to the pole 34*b* subjects the tape to a longitudinal field produced by the schematically shown magnet 34. The magnetic material of the tape forms part of a magnetic circuit which includes the core 34, pole 34*a*, tape 10, and pole 34*b*. The speed of tape transport is so chosen that by the time the tape 10 passes from the heat source 11 to the pole 34*b* the tape has cooled to a temperature below which it will retain its induced preferred orientation. The function of the cathode ray tube 38, and the alternative heating assembly 20 will be hereinafter described in connection with selective area magnetic annealing.

Figure 4:
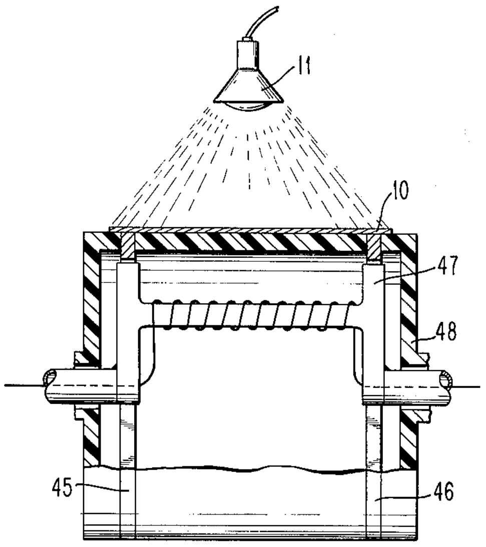
FIG. 4 shows an apparatus for magnetically annealing a material to produce a transverse easy axis of magnetization.

Apparatus for producing a transverse field is schematically shown in FIG. 4. Here, a stationary two pole magnet 47 is employed in coaction with the annular magnetic rings 45 and 46 which underlie the tape 10. The rings 45 and 46 are integral with a rotating drum 48 around which the tape 10 is wrapped. Again a heat lamp 11 is employed to raise the temperature of the magnetic material to its magnetic annealing temperature, and by virtue of the extent of the wrap of the tape 10 around drum 48 and the rotational speed thereof, the tape 10 cools while subjected to the transverse field produced by the magnet 47.

Figure 5:
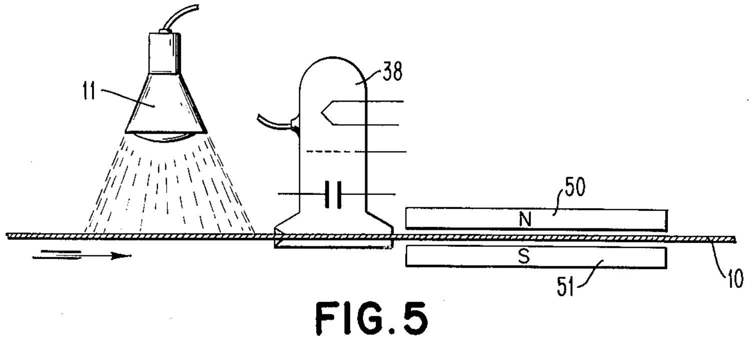
FIG. 5 shows an apparatus for magnetically annealing a material to produce a vertical easy axis of magnetization.

For annealing under the influence of a vertical field an apparatus such as that shown schematically in FIG. 5 can advantageously be employed. Here the tape 10 is first heated, as by lamp 11, and then passed between the poles 50 and 51 of a magnet which develops a vertical field in the tape. Again the speed of tape transport is so adjusted that by the time the tape 10 leaves the gap between the poles it has sufficiently cooled. The cathode ray tube 38, used for selective area heating will be described subsequently.

In the preceding exposition, apparatus has been described, which through uniform heating of the magnetic material, and cooling in the presence of a magnetic field produces a magnetic tape material having superior magnetic properties uniformly distributed. A tape thus prepared, preferably by the apparatus of FIG. 3, in which the tape is magnetically annealed with its easy axis disposed longitudinally, can be utilized in a conventional digit magnetic recording machine in which the magnetic transducers are disposed with their pole pieces developing a longitudinal field. Other apparatus employing vertical or transverse recording would employ tape prepared with correspondingly oriented fields.

By application of the same principles of magnetic annealing employed in producing a superior recording medium, a record having discrete spots or areas which are magnetically annealed can be produced. So too, a gradient of magnetic annealing strength can be produced. In the former instance the record produced would be suitable for manifesting a digital type of recording, whereas in the latter instance the record would be suitable for recording pictorial, or analogue information. Necessarily the magnetic annealing employed in these instances must vary in accordance with the information to be recorded. For strictly digital information, wherein the presence or absence of a phenomenon in a given spatial location denotes respectively a binary 1 or binary 0, the selective magnetic annealing of spots in the record, while the remaining record material has a random orientation, will provide an easy axis orientation in only those spots so treated. A conventional magnetic transducer can then be employed to detect the treated spots much in the same fashion that a transducer detects the saturated spots produced by conventional recording techniques. To effect the necessary spot annealing it is required (1) that the spots to be treated be heated while the remaining material remain cool and the whole of the material be subjected to a magnetic field while the spots cool, or (2) that the whole of the material be heated and only the spots be subjected to the necessary fields while the whole of the material cools, or (3) the whole of the material is uniformly magnetically annealed and the spots which are to manifest the digital record heated and cooled without a magnetic field to thus destroy the effect of the magnetic annealing as to those spots. While any of these methods are contemplated, apparatus operating in accordance with the second method requires that the annealing field be selectively applied to the required spots during the cooling period. For a continuous motion recording device this requires a continuous registration between the cooling record and a movable magnet assembly having the capability of producing a shaped magnetic field as will hereinafter be explained.

Figure 6:
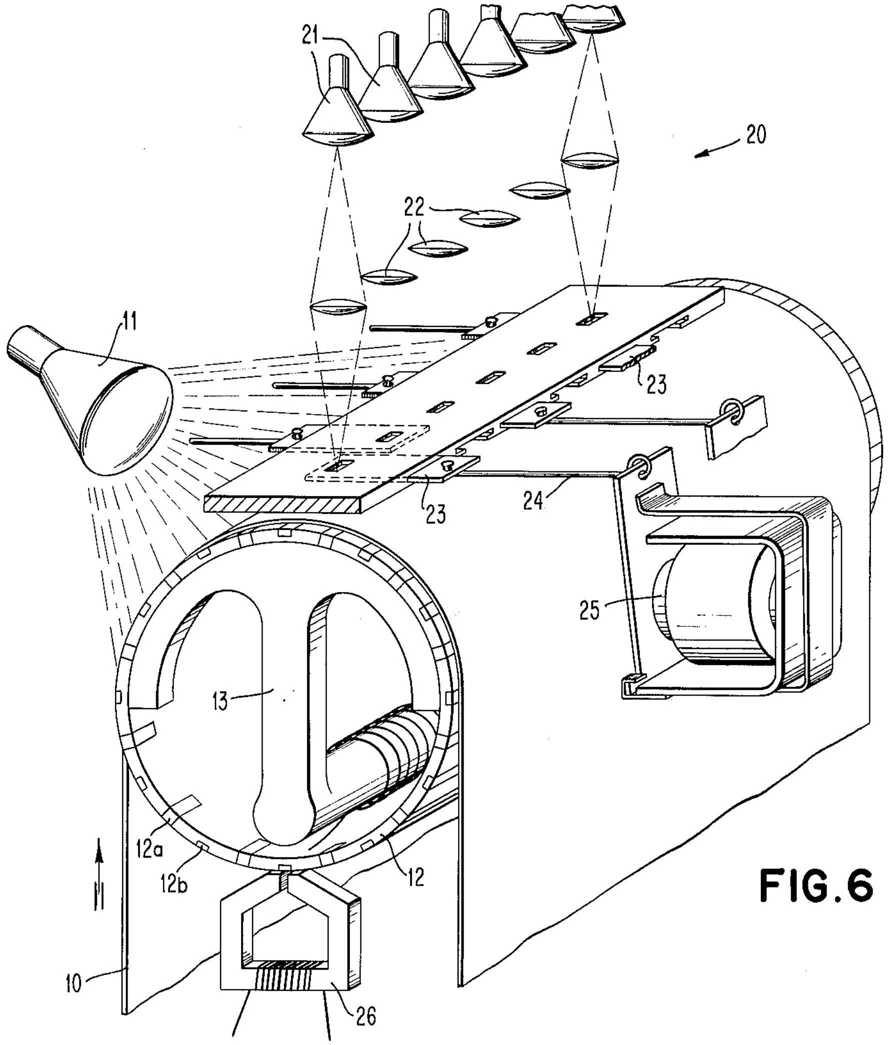
FIG. 6 shows one form of apparatus for digital recording by magnetic annealing.

Reference to FIG. 6 will provide an understanding of the principles involved in the selectively magnetic annealing of discrete spots on a record material so as to produce a digital record. Again the magnetic record material 10 in web form is fed, with the magnetically annealable magnetic coating to the outside, over a drum 12 which provides the necessary constant magnetic field while the material is cooling. A heat source 11 is again provided. In this application the quantity of heat is adjusted so that the surface of the tape 10 is preheated if necessary to a predetermined temperature. The additional heat required to raise the material to a temperature where it can be magnetically annealed is selectively applied to discrete areas of the material by the assembly 20, which includes individual heat sources 21, focusing lenses 22, and separate shutters 23 each individually actuable, as for example, by pull rods 24 and magnets 25. By virtue of the configuration of apparatus shown a 6 bit parallel digit code can be recorded across the tape 10 by combinatorially energizing the magnets 25 in synchronism with the tape feed. The drum 12 is more fully described in IBM Technical Disclosure Bulletin, vol. 3, No. 2 for July 1960 at pages 24 and 25 entitled "Magnetic Commutator" by W. J. Rueger. Briefly it includes the magnetic segments 12*a* and 12*b* which through respective coaction with the two poles of a stationary electromagnet 13 are oppositely magnetically polarized in alternate succession, so as to provide transversely extending bands of fields in the tape, the fields having a longitudinal orientation. The transducer 26 senses the segments 12*a* and 12*b* and provide the requisite timing to gate the operation of the magnets 25. The spots thus produced will have a longitudinal easy axis of magnetization while the remaining magnetic material will have a random orientation. The lateral spot spacing will be determined by the lateral spacing of the shutters 23, and the longitudinal spacing by the disposition of the segments 12*a* and 12*b*.

The same apparatus employed in FIG. 6 for selectively heating discrete areas of the record material can be equally well utilized in the other field producing devices of FIGS. 3, 4, and 5. For example, the box labelled "20 FIG. 6" in FIG. 3 exemplifies the selective heating element 20 which is employed with the longitudinal field producing apparatus thereof.

Also shown in FIG. 3 is an alternative and more flexible apparatus for providing the additional heating required to raise the temperature of discrete spots to the magnetic annealing temperature. The tape 10 is passed by a labyrinth seal of well-known construction into the cathode ray tube 38, whose vacuum is maintained at the desired level by constant pumping. There, by controlling the grid potential as well as the deflection voltages, the electron beam can be directed in any desired strength to any given area of the tape in timed synchronism with the feed of the tape to produce controlled localized heating in any desired area under the control of image control apparatus. If the cathode ray tube 38 is controlled according to a gradient or gray scale so as to record a pictorial representation and a longitudinal field applied as in FIG. 3, it is necessary that the pictorial representation be broken up into a matrix of spots, as is done in halftone printing, so as to preserve the discrete spot character of the recording. Absent such expedient a longitudinal line, for example, would fail to record.

For pictorial recording, therefore, the vertical field apparatus of FIG. 5 is preferably employed. Here, as before, the heat lamp 11 provides preheating, if found to be necessary, and the cathode ray tube 38 provides the additional selective heating, and the magnet poles 50 and 51 the vertical field while the tape cools. In this application both the deflection circuits and the grid circuit are controlled in accordance with the pictorial information to be recorded. As magnetic annealing depends upon the annealing temperature, a portion of material that is heated to a higher temperature will be more strongly annealed than an area which is less strongly heated. Thus, by controlling the beam intensity it is possible to reproduce in the magnetic material a gradient of magnetic annealing strengths corresponding to the gray scale of a pictorial representation.

Figure 7:
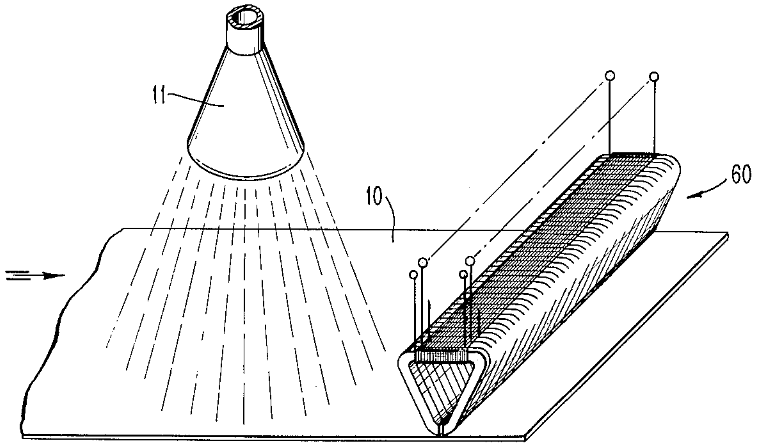
FIG. 7 shows an alternate form of apparatus for digital recording by magnetic annealing.

While all of the foregoing apparatus has provided for selective heating of areas of the record material, and cooling in the presence of a magnetic field, it is within the contemplation of the invention to produce a similar end product by uniformly heating the magnetic material and then cooling in the presence of a magnetic field which varies in gradient according to the desired information to be recorded. Again the binary type of digital recording is the easiest of illustration and comprehension, for it offers a simple presence or absence type of operation. If, as in FIG. 7, the tape 10 is first uniformly heated by a heat source 11 to a temperature above that to which the material is responsive to magnetic annealing and then moved beneath the multi-channel magnetic transducer 60 and held there stationary while the material cools, the various individual gaps comprising the transducer can be selectively energized as is now conventional in digital recording. The fields thus produced in the discrete areas of the record will provide the selective annealing of those codal areas wherein a binary 1 is to be recorded. The remaining areas, even though they have been heated, will not be magnetically annealed as they have not cooled in the presence of a unidirectional field. Any of the well known multichannel magnetic transducers can be employed in this application, although one producing a longitudinal field in the tape is preferred, as a tape so prepared can be sensed by a conventional tape recording machine. The choice of heads is, of course, dictated by the desired orientation of the easy axis of the spots. Alternatively, the shaped annealing field can be produced by a magnet having a pole piece shaped in character configuration as is employed in magnetography.

For pictorial recording by uniform heating, and cooling in the presence of a variable strength magnetic field the vertical field orientation is again preferred. To obtain a fine resolution a scanning system such as that employed in the magnetic recording of television pictures is utilized. Here the preheated magnetic material is repeatedly scanned by a magnetic transducer having a vertical field. The transducer makes rapid passes over the same transverse line of record material while it cools, the transducer being energized with a current modulated corresponding to the gray scale to be reproduced. Each incremental area of the material is thus exposed during the cooling period to successive bursts of magnetic energy the total integrated energy of which bursts provides the requisite variations in magnetic field to produce the magnetic annealing gradient. While the successive scans are being effected, the tape is held stationary, and is only fed in intermittent motion between the series of successive scans.

Exemplary parameters of a typical discrete spot recording of the material prepared as hereinabove described include an exposure time to infrared radiation of .25 second wherein the instantaneous tape temperature was approximately 160° C. and the field strength applied to the record while cooling was in the order of magnitude of 1250 oersteds applied longitudinally of the tape. By using an electron beam means for heating writing speeds of several thousand inches per second can be obtained. The magnetically annealed spots thus recorded can be sensed by a conventional magnetic head at a tape speed in the neighborhood of 30 inches per second, although these parameters are by no means limits of performance. The record is erasable with either an A.C. or D.C. transverse field but can be "redeveloped" by a longitudinal D.C. field. Thus, the spots so recorded are permanent in nature, in that they can only be erased by reheating the material. The demagnetization or temporary erasure does not destroy the record-significant discontinuities in the material properties, but merely temporarily renders the treated areas incapable of detection by conventional sensing apparatus.

The duality of a record produced by the selective magnetic annealing of given areas arises by virtue of the capability of its being temporarily erased by the application of an A.C. field or of a D.C. erasing field applied transverse to the axis of annealing. If all of the spots are erased, the record material is then "clean," and can be processed through a conventional magnetic tape machine which will record a new record thereon. This new record does not destroy the recoverability of the original record, which can only be destroyed by heating. The new record, however, is erasable simply by the application of an erasing field in well-known fashion, and once erased cannot be recovered. The original record, however, reappears upon the reapplication of a D.C. field aligned with the field employed for magnetically annealing the first record spots. So too, if for example the original record contained a binary 1 in a given discrete spot, the attempted writing of a new 1 in that same location as part of a new record will merely provide the requisite longitudinal field to reestablish the original binary 1. Insofar as the sensing circuits are concerned, they detect a 1, which in the example chosen is common to both records. If the original record contained a 1 and the new a 0, then following the temporary erasure of the original record, the recording transducer would not be energized to cause the 1 to reappear, and the sensing circuits now detect a 0. Conversely, if the original discrete record spot contained a 0, the material in that area would be unannealed and have randomly oriented magnetic axis. Subsequent erasing would not alter that spot, but subsequent recording by a magnetic recording head will record a 1 in that spot just as if the tape had no history of magnetic annealing. In fact, as to that particular spot the tape material is essentially the same as any of the well-known oxide coated tapes, and will react to recording by known techniques in the same manner. Similarly, it will produce a reaction in a magnetic read head as does conventional tape.

From the foregoing it will be appreciated in retrospect that with the discovery of a magnetic material that has a response to magnetic annealing at a temperature sufficiently low so as to prevent damage to the backing material upon which the magnetic powder is deposited, it has become possible to subject the magnetic record material to magnetic annealing, either uniformly so as to produce an improved record material for utilization in known processes and apparatus, or nonuniformly so as to produce a permanent magnetic record having attributes, the capability of receiving a second superimposed record, for example, not hitherto achieved. With the improved magnetically annealed record material the recording by selective heating of the material in the absence of an external magnetic field probably offers the most practical approach.

While the invention has been particularly shown and described with reference to a preferred embodiment thereof, it will be understood by those skilled in the art that various changes in form and details may be made therein without departing from the spirit and scope of the invention.

What is claimed is:

1. A magnetic record receiving member comprising a nonmagnetic substrate, and a particulate mass of magnetic material adhered to said substrate in a thin stratose dispersion, the said magnetic material being in a magnetically annealed state with the easy axis of magnetization oriented in a predetermined direction.

2. The record receiving member of claim 1 wherein the magnetic material comprises a cobalt-substituted magnetite having the formula $Co_xFe_{3-x}O_4$, wherein $x$ has a value in the range from .01 to 1.0.

3. A magnetic record manifesting stored information by ordered discontinuities in the properties of the magnetic record material comprising a nonmagnetic substrate, and a magnetic material having a responsiveness to magnetic annealing adhered thereto, the said magnetic material having discrete areas only thereof which are magnetically annealed, the spatial distribution of which areas have data significance.

4. The magnetic record of claim 3 wherein the magnetic material comprises a cobalt-substituted magnetite having the formula $Co_xFe_{3-x}O_4$, wherein $x$ has a value in the range from .01 to 1.0.

References Cited by the Examiner

UNITED STATES PATENTS

| | | | |
|---|---|---|---|
| 2,643,130 | 6/1953 | Kornei | 274—41.4 |
| 2,793,135 | 5/1957 | Sims et al. | 340—174.1 |
| 2,816,053 | 12/1957 | Berge | 148—100 |
| 2,869,878 | 1/1959 | Camras | 274—41.4 |
| 2,900,282 | 8/1959 | Rubens | 117 |
| 2,915,594 | 12/1959 | Burns et al. | 179—100.2 |
| 2,929,670 | 3/1960 | Garrity | 346—74 |
| 2,952,503 | 9/1960 | Becker | 346—74 |
| 2,961,360 | 11/1960 | Kouvel et al. | 148—103 |
| 2,989,595 | 6/1961 | Hunter | 179—100.2 |
| 3,031,341 | 4/1962 | Eschenfelder | 117 |
| 3,039,891 | 6/1962 | Mitchell | 117—93.2 |

IRVING L. SRAGOW, *Primary Examiner.*

NEWTON N. LOVEWELL, *Examiner.*